United States Patent [19]

Ellwanger

[11] Patent Number: 4,941,434
[45] Date of Patent: Jul. 17, 1990

[54] QUICK CONNECT RETAINING LEASH

[76] Inventor: Phillip Ellwanger, 910 Spring St., Petoskey, Mich. 49770

[21] Appl. No.: 230,865

[22] Filed: Aug. 11, 1988

[51] Int. Cl.⁵ .................................................. A01K 27/00
[52] U.S. Cl. .................................... 119/109; 24/129 B; 24/265 BC
[58] Field of Search ................ 119/96, 109; 24/129 B, 24/182, 200, 265 A, 265 BC, 479

[56] References Cited

U.S. PATENT DOCUMENTS

| | | | |
|---|---|---|---|
| 1,383,665 | 7/1921 | Rohan | 24/129 B |
| 2,309,971 | 2/1943 | McLarn | 24/129 B X |
| 2,909,154 | 10/1959 | Thomas | 119/109 |
| 3,678,543 | 7/1972 | Hobbs | 24/129 B X |
| 4,252,084 | 2/1981 | Willow | 119/96 |
| 4,292,932 | 10/1981 | Wooderson | 119/109 |

FOREIGN PATENT DOCUMENTS 8800540  1/1988  World Int. Prop. O. ............ 119/96

Primary Examiner—Robert P. Swiatek
Attorney, Agent, or Firm—Robert L. McKellar

[57] ABSTRACT

What is disclosed is a device which allows small animals to be tethered by a leash in vehicles and which allows the handler to quickly attach and detach the animal's leash to a car safety belt keeper member.

7 Claims, 1 Drawing Sheet

QUICK CONNECT RETAINING LEASH

FIELD OF THE INVENTION

This invention relates in general to pet accessories and more particularly, to a quick connect retaining leash for restraining small animals such as dogs and cats in automotive vehicles.

BACKGROUND OF THE INVENTION

Small pets, such as cats and dogs are subject to travel in automobiles and trucks just as are their owners. Such pets are usually transported in such vehicles totally untethered or are restrained by harnesses and the like. Further, sometimes, for the safety of the animal, they are further restrained by boxes or cages which makes the travel uncomfortable.

It makes sense to tether an animal in a moving vehicle, not only for the safety of the animal, but for the safety of the human occupants, in that the animal, if not tethered in some manner, can jump on the driver, or distract the driver to the extent that an accident may occur. Thus, there has been developed over the last few years, a large number of devices to tether, harness or enclose transported animals.

One prior art device is disclosed in U.S. Pat. No. 4,292,932, to Wooderson. The Wooderson device consists of a tether which is adapted to be anchored between a door and a door jamb of an automobile. The device is effective only as long as the vehicle door remains closed.

Another similar device is the device of Willow. disclosed in U.S. Pat. No. 4,252,084, in which a restraint for dogs in an open bed of a pickup truck is described. The tether attached to the dogs collar is further attached to a tether stretched across the bed of a pickup truck and attached to the sides of the bed of the pickup truck by hook means.

Yet another tethering strap arrangement for animals can be found in the disclosure of Thomas, in U.S. Pat. No. 2,909,154, in which a tether is attached to a device affixed to the upright part of an automobile seat such that the animal is restrained, but has the ability to slide from side to side of the automobile because of the slidability of the attachment on the anchor means.

None of the prior art devices however, have the advantages of the adaptability of the instant device to the already existing seat belt means as an anchor, and the quick leash disconnect means of the device, of this invention.

SUMMARY OF THE INVENTION

In accordance with the present invention, there is provided a locking plate leash holder comprising an elongated single flat member of essentially rectangular shape, having on one end a configuration adaptable and detachedly lockable into an automotive seat safety belt keeper member, and on the opposite end, a series of open sided slots through the planar surface and perpendicular to the long axis of the elongated single flat member and, intermediate the open slots and the adaptable, lockable configuration, a perforation through the planar surface of the elongated single flat member to accomodate the insertion therethrough of a leash.

The present invention further comprises a quick connect retaining leash comprising in combination a leash and a locking plate as described above.

It is an object of this invention to provide a retaining device for pets which fully and safely restrains the animal. It is a further object of this invention to provide a retaining device for pets which can be readily attached and detached from both the automobile anchor and the pet, if desired, for the convenience of the pet and the handler of the pet.

The foregoing and other objects of this invention as well as the invention itself can be fully understood from the following description, specification, and drawings.

DESCRIPTION OF THE PREFERRED EMBODIMENTS

Figure 1:
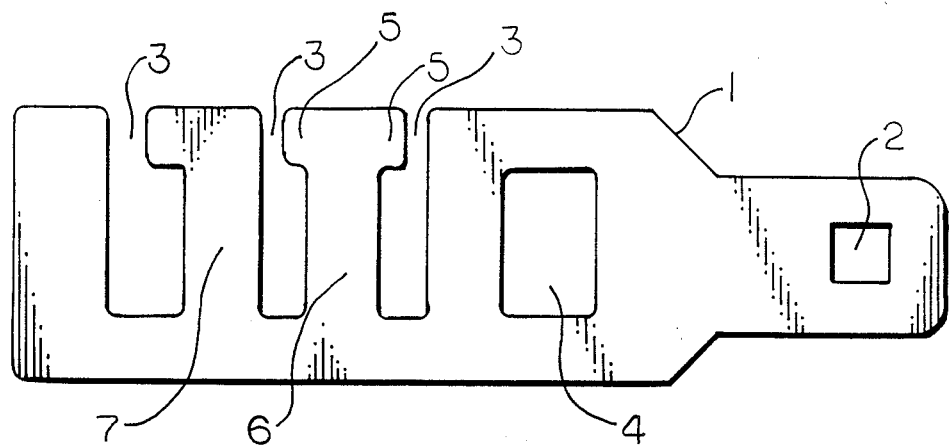
FIG. 1 is a perspective view showing the locking plate of this invention.

Referring more particularly to the drawings. FIG. 1 shows a perspective view of the locking plate of this invention wherein there is shown an elongated single flat planar member 1 having a hole 2 through its planar surface at one end. This end of the device of the invention is the end which is insertable in a keeping member of an automotive seat belt apparatus (not shown). This end of the device is designed such that it is essentially universal in its ability to fit almost all of the automobile and truck seat belt configurations that are manufactured in the United States, and in most foreign countries today.

The opposite end of the inventive device consists of a configuration in which there are several slots 3 cut into the metal such that they are open on one common edge of the flat planar member 1, and perpendicular to the long axis of the flat planar member. In addition to the slots 3, there is also a hole 4 cut through the planar surface of the flat member 1 at a location essentially between the hole 2 and the slots 3. The purpose of this hole 4 is for the stabilization of any leash that is mounted on the locking plate The number of slots 3 is not critical, and if the handler of the animals wants to use a single device of this invention to handle several animals at the same time, a device of this invention may be used having any number of slots in excess of about three slots.

The tabs 5 are arranged during manufacturing of the device, for easy mounting and removal of a leash from the locking plate. In FIG. 1, post 6 is shown as having two tabs 5, one on either side of the post, but this is not critical as the invention contemplates that the tabs can be either singular on a post as shown on post 7, or can be double on the post as is shown on post 6.

Figure 2:
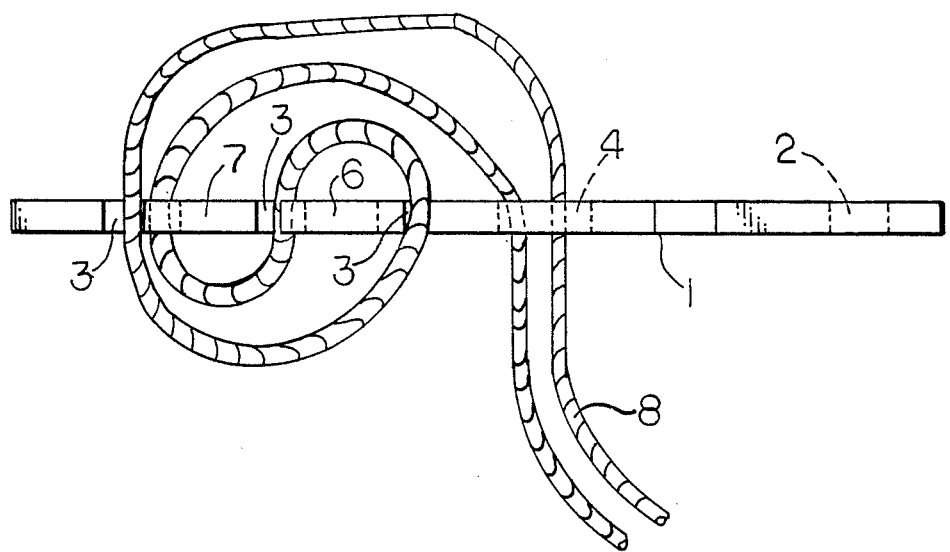
FIG. 2 is a side view of the locking plate of FIG. 1 in combination with a leash mounted thereon.

Turning to FIG. 2, there is shown the locking plate of FIG. 1 in combination with a leash 8. It should be noted that the configuration of the attachment of the leash 8 includes the insertion of a looped leash through the hole 4, the passage of the looped leash through one of the slots, leaving at least two slots open between such insertion and the hole 4, and then passing the loop of the leash over the post 6, and the whole leash is then pulled tight to secure it on the lock plate. In this configuration, the leash is stabilized by the hole 4 because it has no openings to the outside, and the leash is secured because of the friction of the overlay of the leash. When it is desired to undo the leash, the leash is simply loosened by reversing the leash through the hole 4 and removing the leash from the post 6.

It is contemplated that the flat member can be manufactured from a variety of materials, it being understood that it only need to be strong enough to survive the rigors of extended use by the handler. Preferred for this invention are metals and toughened plastics. Most preferred are metals The instant inventive device allows the use of almost any material that is flexible to be used as the leash. Thus, this inventive device allows for the use of soft, flexible leashes, or one can use lightweight chains.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are intended to cover and embrace any such modifications within the limits only of the true spirit and scope of the invention.

What is claimed is:

1. A locking plate leash holder comprising essentially of an elongated flat member of essentially rectangular shape and having at least one planar surface, having on one end, a configuration detachedly lockable into an automotive seat safety belt keeper member, and on the opposite end, a series of open sided slots through the at least one planar surface and perpendicular to the long axis of the elongated single flat member and, intermediate the open slots and the lockable configuration, a perforation through the at least one planar surface of the elongated single flat member to accomodate the insertion therethrough of a leash.

2. A quick connect safety leash comprising in combination a leash and a locking plate, which locking plate consists essentially of a single flat member of essentially rectangular shape and having at least one planer surface, having on one end, a configuration detachedly lockable into an automotive seat safety belt keeper member, and on the opposite end, a series of open sided slots through the at least one planar surface and perpendicular to the long axis of the single flat member and, intermediate the open slots and the lockable configuration, a perforation through the at least one planar surface of the single flat member to accommodate the insertion therethrough of a leash.

3. A quick connect retaining leash as claimed in claim 2 wherein the leash is manufactured from leather.

4. A quick connect retaining leash as claimed in claim 2 wherein the leash is manufactured from synthetic polymers.

5. A quick connect retaining leash as claimed in claim 2 wherein the leash is manufactured from chain.

6. A quick connect retaining leash as claimed in claim 2 wherein the leash is manufactured from rubber.

7. A quick connect retaining leash as claimed in claim 2 wherein the leash is manufactured from rope.

* * * * *